(No Model.)
J. Y. LARAMY.
COMBINED CULTIVATOR AND INSECTICIDE DISTRIBUTER.
No. 548,713. Patented Oct. 29, 1895.
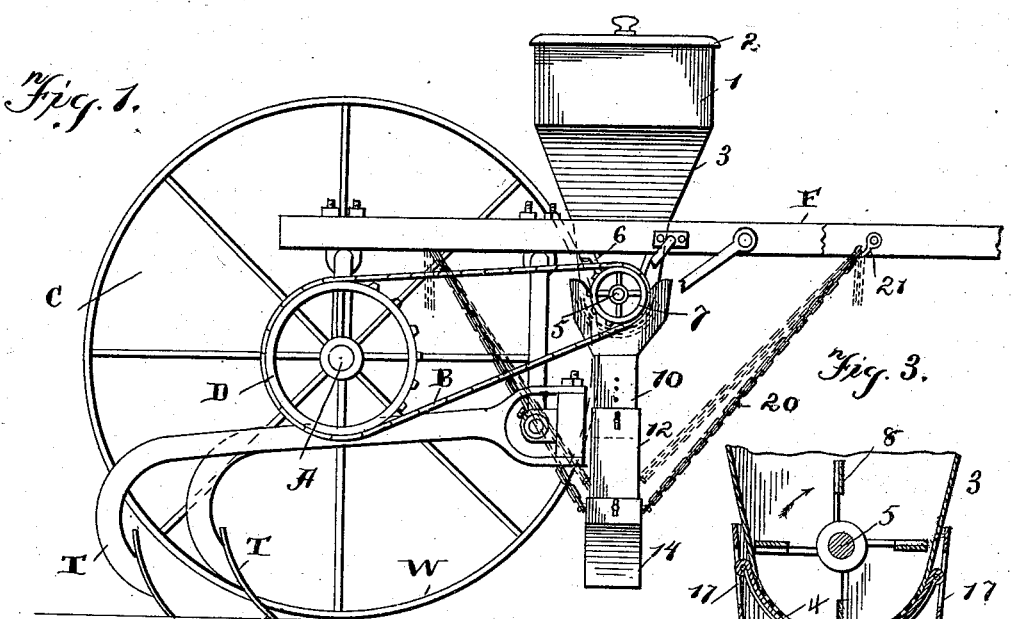
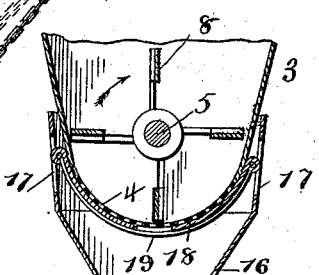
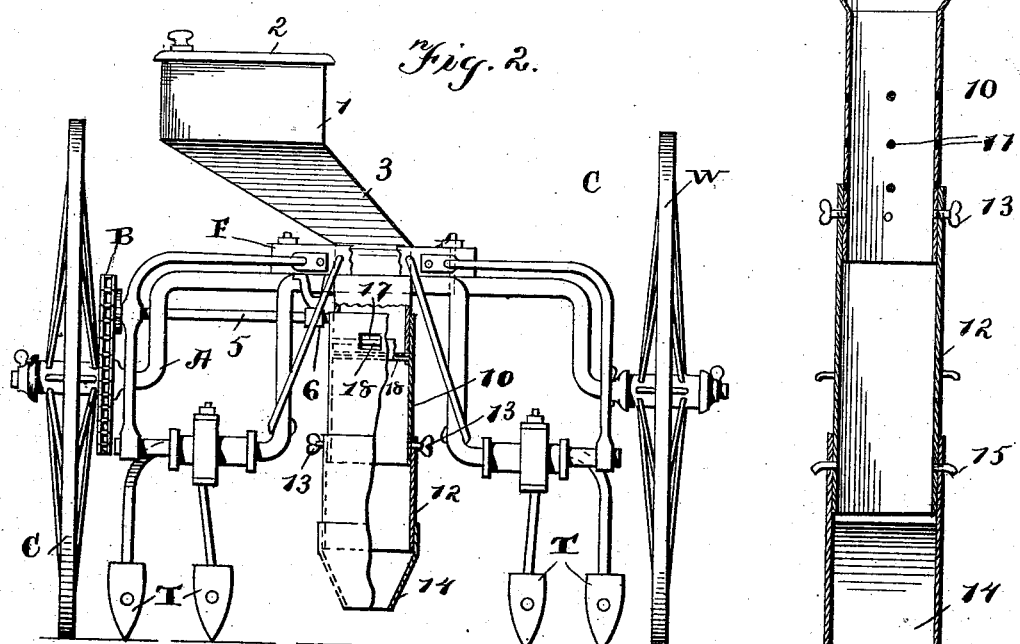
Witnesses:
Geo. E. Frech
A. L. Collamer
Inventor:
Joseph Y. Laramy
By his Attorneys
Louis Feesert & Co.

UNITED STATES PATENT OFFICE.

JOSEPH YENDELL LARAMY, OF ST. PAUL PARK, MINNESOTA.

COMBINED CULTIVATOR AND INSECTICIDE-DISTRIBUTER.

SPECIFICATION forming part of Letters Patent No. 548,713, dated October 29, 1895.

Application filed January 28, 1895. Serial No. 536,456. (No model.)

*To all whom it may concern:*

Be it known that I, JOSEPH YENDELL LARAMY, a citizen of the United States, residing at St. Paul Park, in the county of Washington and State of Minnesota, have invented a new and useful Combined Cultivator and Insecticide-Distributer, of which the following is a specification.

This invention relates to cultivators; and the object of the same is to produce an insecticide-distributer which may be attached to the frame of the cultivator, so as to distribute the poison at the same time that cultivation is being done.

To this end the invention consists in the specific details of construction of the attachment, all as hereinafter more fully described and claimed, and as illustrated in the drawings, wherein—

Figure 1 is a side elevation of a cultivator with my attachment applied in operative position thereon. Fig. 2 is a front elevation showing the spout of the attachment partially in section. Fig. 3 is an enlarged central vertical section through the attachment.

Referring to the said drawings, the letter C designates as a whole a cultivator of any approved pattern or type, preferably employing two supporting-wheels W, mounted on an axle A and carrying the framework F, and the latter supports the teeth T in the usual or any well-known manner, all forming no essential part of the present invention. Secured to the inner end of the hub of one of said wheels W is a driving-wheel D, preferably a sprocket, from which extends a chain belt B, that furnishes the power necessary to the successful operation of the devices described below; and with this exception the construction of the parts of the cultivator is entirely optional. It is only desired that the fertilizer-distributer hereinafter described shall be mounted and supported by the framework F of a cultivator C, so that while the cultivator is being drawn over the ground and guided and manipulated by the operator, the poison may be properly distributed upon the plants. Thus it will be seen that by the use of my improved attachment two practically independent machines or devices are mounted upon one set of wheels, are drawn by one horse, and are manipulated by one operator.

Coming, now, to the essential features of my invention, the numeral 1 designates a hopper of a size to contain about a bushel of ashes, land plaster, or other insecticides, which are useful for exterminating bugs and other insects on growing plants and sometimes in the roots, and 2 is the cover of this hopper. From the bottom of the hopper a pipe 3 leads downward, and its lower end is rounded and provided with a sieve 4, as best seen in Fig. 3.

Journaled axially through the center of this lower rounded end is a shaft 5, hung in bearings 6 beneath the framework F and having at its outer end a sprocket-wheel 7, which is driven by the chain belt B, above mentioned. On the inner end of this shaft is a beater 8 of any approved pattern, (here shown as consisting of four radiating arms with blades at their outer extremities,) and when the cultivator moves, the rotation of its driving-wheel, through the belt, drives this beater or agitator and forces the insecticide through the meshes in the sieve 4. Below said sieve is located a spout consisting of an upper section 10, provided with a number of holes 11, a lower section 12, telescoping, preferably, over the lower end of the upper section and adjustably connected therewith by pins or set-screws 13, and a mouth 14, telescoping also over the lower end of the lower section 12 and removably connected thereto by pins or set-screws 15. The lower end of this mouth is preferably tapered so as to deliver a rather fine stream of insecticide when the mouth is used; but it can be removed by withdrawing the pins 15, as will be clear. The upper end of the upper section 10 is flaring or funnel-shaped, as at 16, and is preferably provided with holes 17 in its front and rear sides. Through these holes the operator may gain access to slides 18, mounted in suitable guides 19 just beneath the sieve 4, and the obvious purpose of these slides is to adjust the size of the stream of insecticide which is permitted to fall down the spout.

20 designates chains, of which there are preferably two, connected at their lower ends with the pins 15 for fastening on the mouth 14 when used, as shown in full lines, or with the lowermost section 12 when the mouth is not used, as shown in dotted lines, and the upper ends of these chains diverge toward the front and rear of the machine and preferably engage hooks 21, carried by the framework F, so as to steady the spout and to permit of the adjustment of the length of the chains.

With this construction, the hopper being filled and the slides 18 being set, as desired, the operator takes his seat on the cultivator, if the latter have one, or walks behind it if it does not, and as soon as the horse begins to move the agitator 8 revolves and the powdered insecticide is delivered down the spout. As above stated, the latter is of telescoping construction, so that its lower end can be adjusted to a point very near the ground, as shown in the drawings, or the mouth can be removed when the plants are larger and rise higher from the ground, or when they are still larger the lowermost section 12 can be raised over the uppermost section 10 and held in adjusted position by the pins or set-screws 13, the lower end of the spout then clearing plants which may be almost full grown. All parts of this device are of the desired sizes, shapes, proportions, and materials, and considerable change in or addition to the specific details of construction may be made without departing from the principle of my invention.

What is claimed as new is—

1. In a cultivator having a framework mounted on wheels, an insecticide distributer comprising a hopper supported by said framework, a pipe depending therefrom and having a curved sieve at its lower end, a spout having a flaring upper end surrounding said sieve and provided with open holes in its sides, and slides moving under the sieve within guides in said flaring upper end and provided with handles opposite said holes, as and for the purpose set forth.

2. In a cultivator having a framework mounted on wheels, an insecticide distributer comprising a hopper at its upper end and a telescoping spout at its lower end, hooks on said cultivator framework, and chains connected with the lower end of the spout and adjustably engaging said hooks, as and for the purpose set forth.

3. In a cultivator having a framework mounted on wheels, an insecticide distributer comprising a hopper at its upper end and a spout at its lower end consisting of an upper section, a lower section telescoping over the upper section, set screws taking through the lower section and engaging the upper section, a mouth depending from the lower end of the lower section, pins detachably connecting said mouth with the lower section, and chains engaging said pins and leading to hooks on said framework, as and for the purpose set forth.

In testimony whereof I have hereunto set my hand in presence of two subscribing witnesses.

JOSEPH YENDELL LARAMY.

Witnesses:
LOUIS FEESER, Jr.,
JOHN F. BRUGGEMANN.